(12) United States Patent
Huang

(10) Patent No.: US 8,035,885 B2
(45) Date of Patent: Oct. 11, 2011

(54) TWDM ELEMENT, IMAGER, AND METHOD FOR TEMPORALLY AND SPATIALLY MODULATING BY USING THE SAME

(75) Inventor: Herb He Huang, Shanghai (CN)

(73) Assignee: Shanghai Lexvu Opto Microelectronics Technology Co., Ltd., Shanghai (CN)

(*) Notice: Subject to any disclaimer, the term of this patent is extended or adjusted under 35 U.S.C. 154(b) by 72 days.

(21) Appl. No.: 12/698,854

(22) Filed: Feb. 2, 2010

(65) Prior Publication Data

US 2010/0195186 A1    Aug. 5, 2010

Related U.S. Application Data

(60) Provisional application No. 61/149,184, filed on Feb. 2, 2009.

(51) Int. Cl.
*G02B 26/00* (2006.01)

(52) U.S. Cl. .......................... 359/295; 359/290; 359/291

(58) Field of Classification Search .................. 359/295
See application file for complete search history.

(56) References Cited

U.S. PATENT DOCUMENTS

2010/0110528 A1* 5/2010 Tang ............................ 359/291
* cited by examiner

*Primary Examiner* — Ricky Mack
*Assistant Examiner* — James Jones
(74) *Attorney, Agent, or Firm* — J.C. Patents

(57) ABSTRACT

A tri wavelength diffracting modulation (TWDM) element, a TWDM imager, and methods of temporally and spatially modulating by using the same are disclosed. The TWDM element includes first and second sets of movable reflective rigid plates under independent electrical actuation, provides four different spatial configurations for reflecting and selectively diffracting incident radiation of three distinguished wavelengths. The TWDM imager is formed with a plurality of the TWDM elements in a regularly spaced planar array configuration on a planar substrate. Incident visible light is spatially modulated by the TWDM imager, either in a time sequential mode or via spatial combination with help of an aligned color filter array.

19 Claims, 4 Drawing Sheets

TWDM ELEMENT, IMAGER, AND METHOD FOR TEMPORALLY AND SPATIALLY MODULATING BY USING THE SAME

CROSS-REFERENCE TO RELATED APPLICATIONS

This application claims priority of provisional application No. 61/149,184, filed on Feb. 2, 2009, entitled "Tri Wavelength Diffractive Modulation Devices", which is incorporated herein by reference in its entirety.

FIELD OF THE TECHNOLOGY

The present invention relates to light modulation devices, and more particularly to a tri wavelength diffractive modulation (TWDM) element, a TWDM imager, and methods of temporally and spatially modulating by using the same.

BACKGROUND

Widely used for microdisplay projection and other optical systems, spatial light modulators are solid state micro array devices that can control or modulate an incident beam of light in a defined spatial pattern that are correlated to a series of electrical inputs of image to the devices, through which, the incident light beam can be modulated in intensity, phase, polarization or direction.

Two of the most commonly used classes of spatial light modulators employ micro-electromechanical system (MEMS) devices in a two dimensional array configured to provide two-dimensional modulation of incident light: a digital mirror device (DMD) from Texas Instruments and a galvanic light valve (GLV) device from Silicon Light Machines. The appeal of the DMD has been evidenced in the widespread adoption, given its high optical efficiency, large etendue, wide bandwidth, high modulation speed and digitalized control algorithm for time sequential color combination and management.

Despite its success in projection display applications, however, the DMD has been recognized with certain shortcomings, such as high power consumption per pixel, particularly for high resolution microdisplay projection applications in cell phones and handheld devices.

The GLV array devices are also recognized with significant appeal in etendue, analog grey-scaling, optical efficiency, modulation speed and particularly, power consumption per pixel. However, the wavelength dependency under a digitalized control algorithm is evident on the GLV devices disclosed in the prior art, particularly for microdisplay projection applications which requires spatial modulation of incident radiation covering visible spectrum and in particular, in association with time sequential or spatial mosaic pattern color management schemes. Accordingly, it is expected to improve digitalization in control algorithm and integration of multi wavelength modulation in projection system applications.

SUMMARY

One aspect of the present invention provides a TWDM element, including a first and second sets of movable reflective rigid plates under independent electrical actuation, provides four different spatial configurations for reflecting and selectively diffracting incident radiation of three distinguished wavelengths: zero distance vertically between two sets of top reflective surfaces for maximum reflection to radiation of all three wavelengths, while first, second and third vertical distances corresponding to an odd integer times first, second and third wavelengths for maximum diffraction specifically to radiation of the first, second or third wavelengths respectively.

The TWDM element enables selectively digitalized modulation of incident electromagnetic radiation in three distinguished wavelengths in a binary mode: maximum reflection and maximum diffraction, which improves digitalization in control algorithm and integration of multi wavelength modulation in projection system applications. Besides, the TWDM element has low power consumption.

Another aspect of the present invention provides a TWDM imager which is formed with a plurality of the TWDM elements in a regularly spaced planar array configuration on a planar substrate. Incident visible light can be spatially modulated by the TWDM imager, either in a time sequential mode or via spatial combination with help of an aligned color filter array.

BRIEF DESCRIPTION OF THE DRAWINGS

The disclosure may be more completely understood in consideration of the following detailed description of various embodiments in connection with the accompanying drawings, in which.

DETAILED DESCRIPTION

The TWDM devices according to the present invention will now be described with reference to FIGS. 1 through 6. For purposes of clarity, part of the extended detail of the devices, that are widely known and are not relevant to the present invention, have been omitted from the following description.

Figure 1:
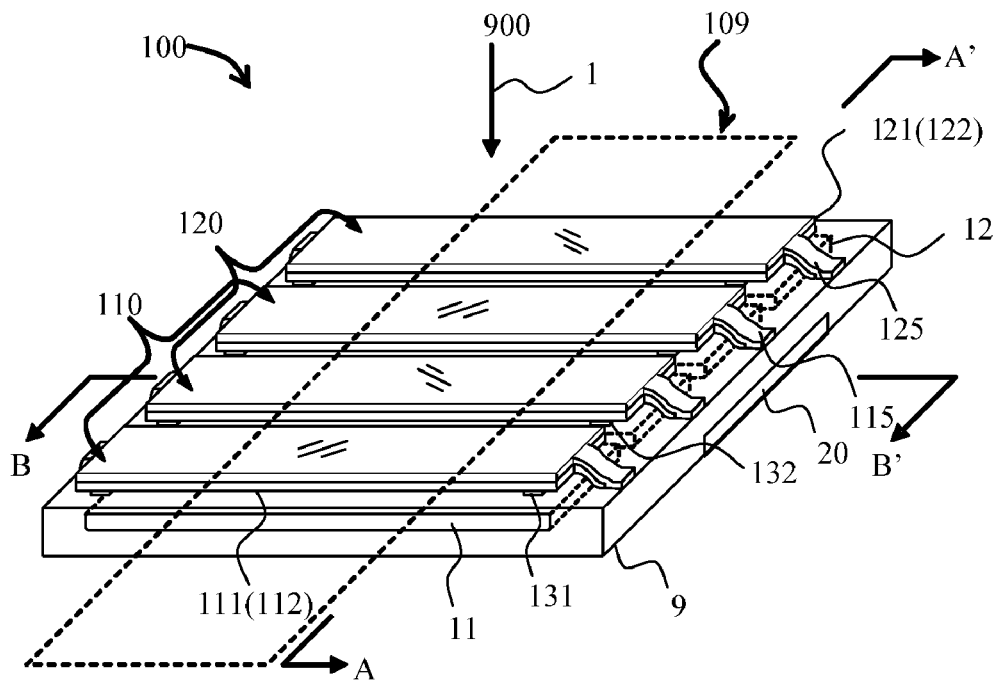
FIG. 1 is a top schematic view of a TWDM element according to an embodiment of the present invention.

FIG. 1 is a top schematic view of a TWDM element 100 according to an embodiment of the present invention. For providing spatial modulation to incident electromagnetic radiation 900 in a first direction 1, the TWDM element 100 includes, as the core pairing components, two sets of movable reflective rigid plates (a first set of movable reflective rigid plates 110 and a second set of movable reflective rigid plates 120 which are independently movable vertically along the first direction 1 while being always kept parallel to each other and a top reference plane 109 perpendicular to the incident electromagnetic radiation 900.

Topping the first set of movable reflective rigid plates 110 and the second set of movable reflective rigid plates 120, two sets of top reflective surfaces (the first set of top reflective surfaces 111 and the second set of top reflective surfaces 121), face and serve the independent local reflectors to the incident electromagnetic radiation 900, preferably configured with the same total reflectivity. Those two sets of top reflective surfaces (the first set of top reflective surfaces 111 and the second set of top reflective surfaces 121) may be made from any one or combination of reflective metals such as silver, aluminum, copper, titanium, platinum, gold and their alloys, and optionally, also serve as two sets of top electrodes (a first set of top electrodes 112 and a second set of top electrodes 122), for generating electrostatic force onto the two sets of movable reflective rigid plates (the first set of movable reflective rigid plates 110 and the second set of movable reflective rigid plates 120) respectively. The first set of top electrodes 112 and the second set of top electrodes 122 may be made from any one or combination of conductive materials comprising silver, aluminum, copper, titanium, platinum, gold, nickel and cobalt Optionally, the two sets of movable reflective rigid plates (the first set of movable reflective rigid plates 110 and the second set of movable reflective rigid plates 120) may be suspended onto an elemental substrate 9 structurally through two sets of deformable connectors (a first set of deformable connectors 115 and a second set of deformable connectors 125), which also provide electrical connection between the two sets of top electrodes (the first set of top electrodes 112 and the second set of top electrodes 122), and an elemental driving circuitry 20 built into the elemental substrate 9.

Respectively opposite to and pairing the two sets of top electrodes (the first set of top electrodes 112 and the second set of top electrodes 122) in vertical alignment, two sets of bottom electrodes (the first set of bottom electrodes 11 and the second set of bottom electrodes 12 which may be electrically connected and jointly charged by the elemental driving circuitry 20 to same electrical potential), are also built into the elemental substrate 9 in parallel to the top reference plane 109 and also electrically connected to the elemental driving circuitry 20. Electrically charged in same or opposite polarizations by the elemental driving circuitry 20, electrostatic contraction is thus generated independently between the first set of movable reflective rigid plates 110 and the elemental substrate 9 as well as between the second set of movable reflective rigid plates 120 and the elemental substrate 9, driving them move vertically in opposite to or along the first direction 1. The elemental substrate 9 may be made from any one of semiconductors comprising silicon, germanium, arsenic and their compounds All the two sets of top electrodes (the first set of top electrodes 112 and the second set of top electrodes 122), and the two sets of bottom electrodes (the first set of bottom electrodes 11 and the second set of bottom electrodes 12) may be made from metals or other conductive materials commonly used in integrated circuits.

Figure 2A:
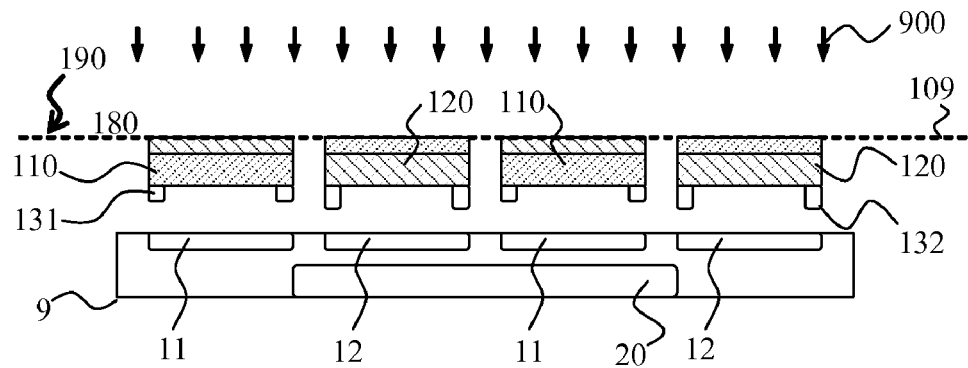
FIGS. 2a, 2b, 2c and 2d are cross sectional views of the TWDM element show in FIG. 1 along A-A', respectively illustrating four distinguished spatial configurations for selectively diffracting and reflecting incident electromagnetic radiation of three different wavelengths.

FIGS. 2a, 2b, 2c and 2d are cross sectional views of the TWDM element show in FIG. 1 along A-A', respectively illustrating four distinguished spatial configurations for selectively diffracting and reflecting incident electromagnetic radiation of three different wavelengths. As shown in FIG. 2a, both the two sets of movable reflective rigid plates (the first set of movable reflective rigid plates 110 and the second set of movable reflective rigid plates 120), are configured being merged with the top reference plane 109 under their natural state with zero electrostatic contractive force, that is, at a zero position 180 with a zero distance 190 therefore with the top reference plane 109, as the two sets of deformable connectors (a first set of deformable connectors 115 and a second set of deformable connectors 125) (FIG. 1), remain un-deformed.

Figure 2B:
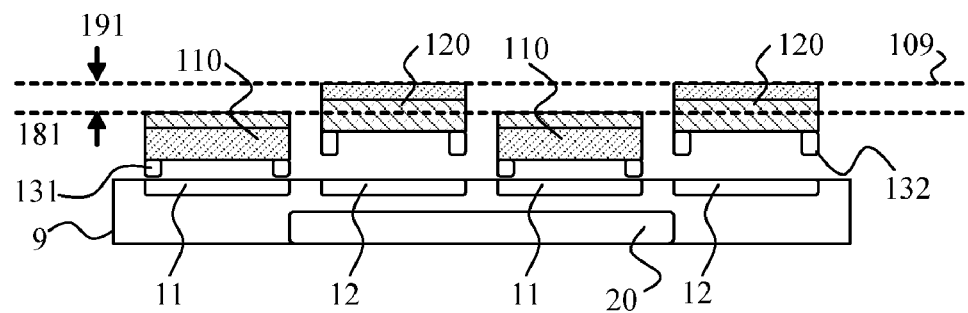
Figure 2C:
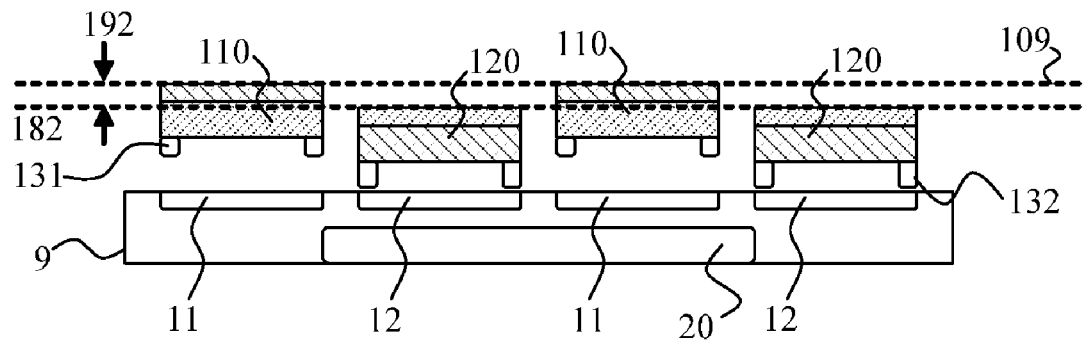

As the two sets of movable reflective rigid plates (the first set of movable reflective rigid plates 110 and the second set of movable reflective rigid plates 120) are electrostatically actuated downward moving closer to the elemental substrate 9 along the first direction 1 under electrostatic contraction, two sets of distance limiters (a first set of distance limiters 131 and a second set of distance limiters 132) are installed, on the bottom surfaces of the two sets of movable reflective rigid plates (the first set of movable reflective rigid plates 110 and the second set of movable reflective rigid plates 120) respectively, eye-viewing the elemental substrate 9. The two sets of distance limiters (the first set of distance limiters 131 and the second set of distance limiters 132) thus provide different physical limits to the independent downward movement of the two sets of movable reflective rigid plates (the first set of movable reflective rigid plates 110 and the second set of movable reflective rigid plates 120) respectively, thus setting the first set of top reflective surfaces 111 at a first vertical distance 191, and/or the second set of top reflective surfaces 121 at a second vertical distance 192, respectively from the top reference plane 109, as shown in FIGS. 2b, 2c and 2d.

Figure 2D:
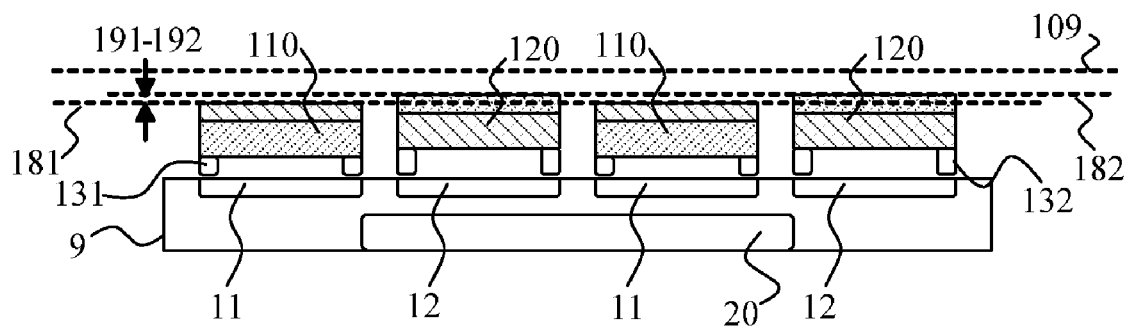

Under independent electrical instructions from the elemental driving circuitry 20, the two sets of movable reflective rigid plates (the first set of movable reflective rigid plates 110 and the second set of movable reflective rigid plates 120) jointly provide the following four distinguished spatial configurations, with four corresponding relative distances between the two sets of top reflective surfaces (the first set of top reflective surfaces 111 and the second set of top reflective surfaces 121): a) a zero or substantially close to zero distance at which both the two sets of movable reflective rigid plates (the first set of movable reflective rigid plates 110 and the second set of movable reflective rigid plates 120) are set at the zero position 180 (FIG. 2a); b) the first vertical distance 191 at which the first set of movable reflective rigid plates 110 are actuated under electrostatic contraction and latched at the first position 181 while the second set of movable reflective rigid plates 120 still stays at the zero position 180 (FIG. 2b); c) the second vertical distance 192 at which the second set of movable reflective rigid plates 120 are actuated under electrostatic contraction and latched at the second position 182 while the first set of movable reflective rigid plates 110 still stays at the zero position 180 (FIG. 2c); and d) the third vertical distance, equal to absolute value of the first vertical distance 191 minus the second vertical distance 192, at which the two sets of movable reflective rigid plates (the first set of movable reflective rigid plates 110 and the second set of movable reflective rigid plates 120) are both actuated under electrostatic contraction and latched at the first position 181 and the second position 182 respectively (FIG. 2d). Herein the two sets of distance limiters (the first set of distance limiters 131 and the second set of distance limiters 132) are simply configured in different thicknesses such that the first vertical distance 191 differs from the second vertical distance 192 as shown in FIGS. 2a, 2b, 2c and 2d.

Including one defining zero or close to zero relative distance between the two sets of top reflective surfaces (the first set of top reflective surfaces 111 and the second set of top reflective surfaces 121), as well as their difference, those four distinguished relative configurations provide the selectable settings for spatially modulating incident electromagnetic radiation 900 of three distinguished wavelengths in a simple binary mode of operation.

The maximum reflection when the first set of movable reflective rigid plates 110 and the second set of movable reflective rigid plates 120 stay at the zero position 180 (FIG. 2a).

Having the two sets of movable reflective rigid plates (the first set of movable reflective rigid plates 110 and the second set of movable reflective rigid plates 120) adequately configured with the first vertical distance 191 substantially equal to $m*\lambda_1/4$, wherein m is a first odd integer and $\lambda_1$ is a first wavelength centering of a first defined spectrum of incident electromagnetic radiation 900, the first set of top reflective surfaces 111 and the second set of top reflective surfaces 121 together provide the maximum diffraction to incident electromagnetic radiation 900 of the first defined spectrum, when the first set of top reflective surfaces 111 are displaced and latched at the first position 181 alone (FIG. 2b).

Similarly, the two sets of movable reflective rigid plates (the first set of movable reflective rigid plates 110 and the second set of movable reflective rigid plates 120) together provide the maximum diffraction to incident electromagnetic radiation 900 of a second defined spectrum centered by a second wavelength $\lambda_2$, wherein the second vertical distance 192 is substantially equal to $n*\lambda_2/4$ and n is another odd integer, when the second set of movable reflective rigid plates 120 is displaced and latched at the second position 182 alone (FIG. 2c).

The maximum diffraction to incident electromagnetic radiation 900 of a third defined spectrum centered by a third wavelength $\lambda_3$ is achieved by configuring the absolute difference between the first vertical distance 191 and the second vertical distance 192, (the actual vertical distance between the first set of top reflective surfaces 111 and the second set of top reflective surfaces 121 is substantially equal to or close to $p*\lambda_3/4$ where p may be any odd integer, when the first set of movable reflective rigid plates 110 is displaced and latched at the first position 181 and the second set of movable reflective rigid plates 120 is displaced and latched at the second position 182 (FIG. 2d).

The incident electromagnetic radiation is visible light while $\lambda_1$, $\lambda_2$ and $\lambda_3$ are three chosen color wavelengths between 380 nm and 750 nm. For example, centering the red color spectrum of 620 to 750 nm, the green color spectrum of 485 to 570 nm, the blue color spectrum of 450 to 495 nm, $\lambda_1$, $\lambda_2$ and $\lambda_3$ are taken as 685.0 nm, 532.5 nm and 472.5 nm, respectively. If the first vertical distance 191 is taken equal or substantially close to $3*\lambda_2/4$ or 513.75 nm (m equal to 3) and the second vertical distance equal or substantially close to $3*\lambda_2/4$ or 399.38 nm (n equal to 3), then the absolute difference between the first vertical distance 191 and the second vertical distance 192 or 114.38 nm is just close to a quarter of the $\lambda_3$ (p equal to 1), that is, a quarter of the centering blue wavelength, 472.5 nm.

Therefore, by independently actuating the first set of movable reflective rigid plates 110 and the second set of movable reflective rigid plates 120, through electrostatic contraction to the first and second sets of bottom electrodes (the first set of bottom electrodes 11 and the second set of bottom electrodes 12), and thus the elemental substrate 9, the TWDM element 100 alternatively provides the maximum diffraction independently to incident illumination of red, green and blue color spectrums defined above, besides the maximum reflection to all the three at the zero position 180 (FIG. 2a). Optionally, the configuration in which the first set of movable reflective rigid plates 110 are displaced with the first vertical distance 191 of 513.75 nm while the second set of movable reflective rigid plates 120 is set at the zero position 180 as shown in FIG. 2b provides the maximum diffraction to the red color illumination centered at 685 nm. And similarly, the configuration shown in FIG. 2c offers the maximum diffraction to the green color illumination centered at 532.5 nm, while the setting illustrated in FIG. 2d by contracting both the first set of movable reflective rigid plates 110 and the second set of movable reflective rigid plates 120, to the first position 181 and the second position 182 respectively with help of the two sets of distance limiters (the first set of distance limiters 131 and the second set of distance limiters 132), gives the maximum diffraction to the blue color illumination centered at 472.5 nm.

The TWDM element 100 enables selectively digitalized modulation of incident electromagnetic radiation in three distinguished wavelengths in a binary mode: maximum reflection and maximum diffraction, which improves digitalization in control algorithm and integration of multi wavelength modulation in projection system applications. Besides, the TWDM element 100 has low power consumption.

For achieving improved global uniformity of diffractive modulation, the two sets of movable reflective rigid plates (the first set of movable reflective rigid plates 110 and the second set of movable reflective rigid plates 120) may be configured in an regularly interwoven planar arrangement in parallel to the top reference plane 109, as shown in FIGS. 1, 2a, 2b, 2c and 2d, if each set contains more than one plates (two plates for each set as shown for illustration). In one optional simple configuration, each set only has a single movable reflective rigid plate and thus the TWDM element 100 comprises two sets of movable reflective rigid plates (the first set of movable reflective rigid plates 110 and the second set of movable reflective rigid plates 120). And furthermore, the two sets of movable reflective rigid plates (the first set of movable reflective rigid plates 110 and the second set of movable reflective rigid plates 120) may take any planar shapes including but not limited to rectangle, square, circle, ellipse, and polygons.

Figure 3A:
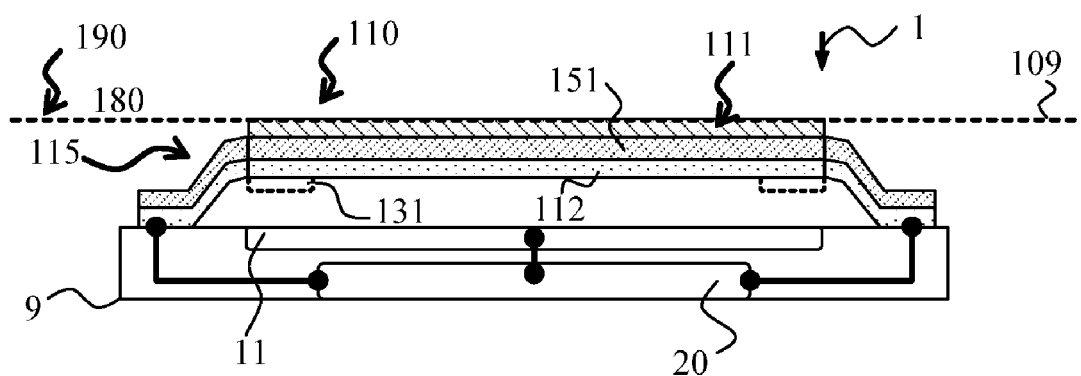
FIGS. 3a and 3b are cross sectional views of the TWDM element show in FIG. 1 along B-B', illustrating an alternative composite structure of two sets of movable reflective rigid plates.
Figure 3B:
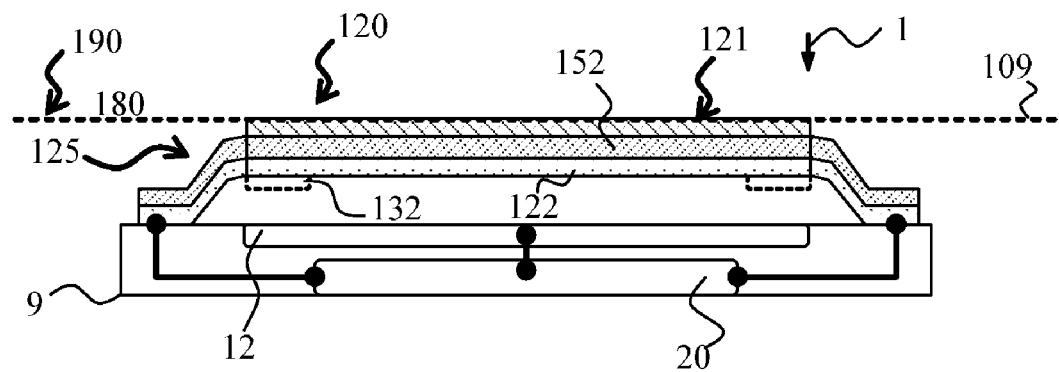

FIGS. 3a and 3b are cross sectional views of the TWDM element 100 in another embodiment of the present invention, illustrating the alternative composite structure of the two sets of movable reflective rigid plates (the first set of movable reflective rigid plates 110 and the second set of movable reflective rigid plates 120). Herein for reinforcing the two sets of movable reflective rigid plates (the first set of movable reflective rigid plates 110 and the second set of movable reflective rigid plates 120), and thus for keeping them flat and parallel to the top reference plane 109 when moving vertically through bending of the two sets of deformable connectors (the first set of deformable connectors 115 and the second set of deformable connectors 125), a first set of reinforcing plates 151 is sandwiched between the first set of top reflective surfaces 111 and the first set of top electrodes 112, and a second set of reinforcing plates 152 is sandwiched between the second set of top reflective surfaces 121 and the second set of top electrodes 122, and thus composed into the two sets of movable reflective plates (the first set of movable reflective rigid plates 110 and the second set of movable reflective rigid plates 120) respectively. The first set of reinforcing plates 151 and the second set of reinforcing plates 152 may be made from a combination of metals or dielectric materials comprising oxides, nitrides, carbides and carbon.

It is obvious that no reflective coating is desired onto the two sets of deformable connectors (the first set of deformable connectors 115 and the second set of deformable connectors 125), being kept opaque, for eliminating the undesirable local reflection and diffraction, as shown in FIGS. 3a and 3b.

Figure 4A:
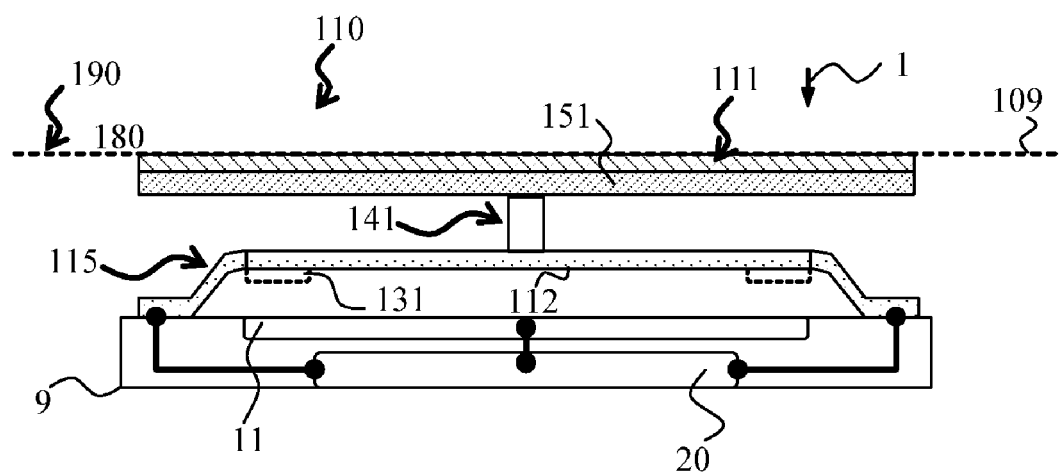
FIGS. 4a and 4b are cross sectional views of the TWDM element shown in FIG. 1 along B-B', illustrating other alternative structures of the two sets of movable reflective rigid plates.
Figure 4B:
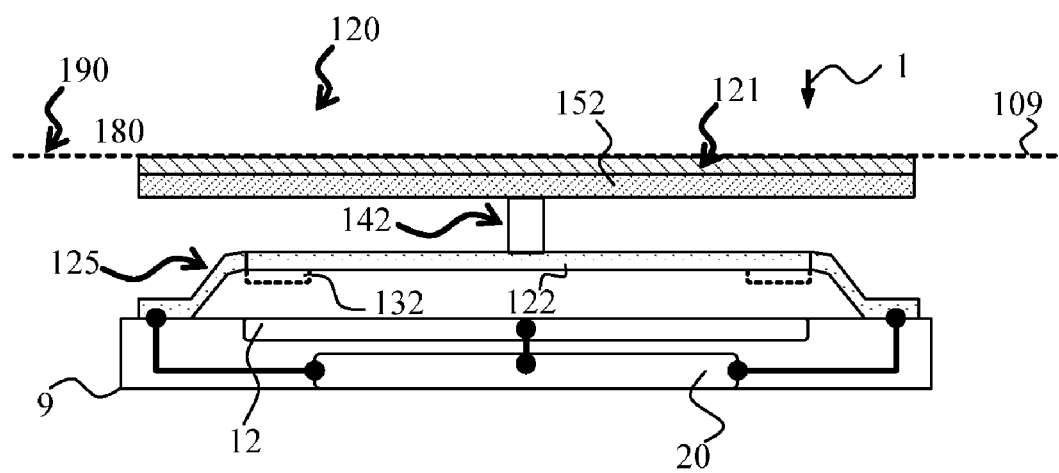

FIGS. 4a and 4b are cross sectional views of the TWDM element show in FIG. 1 along B-B', illustrating other alternative structures of the two sets of movable reflective rigid plates (the first set of movable reflective rigid plates 110 and the second set of movable reflective rigid plates 120). For further increasing the total active areas and thus the fill factor for reflection and diffraction (to incident electromagnetic radiation 900) on the TWDM element 100, a dual-layer suspended MEMS structure is employed as shown in FIGS. 4a and 4b. Herein the two sets of movable reflective rigid plates (the first set of movable reflective rigid plates 110 and the second set of movable reflective rigid plates 120) may further include two sets of displacement translators (the first set of displacement translators 141 and the second set of displacement translators 142), which translate the vertical movement of the first set of top electrodes 112 and the second set of top electrodes 122 association with bending of the two sets of deformable connectors (the first set of deformable connectors 115 and the second set of deformable connectors 125), under electrostatic contraction generated with the two sets of bottom electrodes (the first set of bottom electrodes 11 and the second set of bottom electrodes 12), driven by the elemental driving circuitry 20. While the first set of top reflective surfaces 111 and the second set of top reflective surfaces 121 reinforced by the first set of reinforcing plates 151 and the second set of reinforcing plates 152 are kept parallel to the top reference plane 109 as moving vertically, the two sets of top electrodes (the first set of top electrodes 112 and the second set of top electrodes 122) are maintained in a closer vicinity to the two pairing sets of bottom electrodes (the first set of bottom electrodes 11 and the second set of bottom electrodes 12), for generating sufficient contractive force with electrical charge of relatively lower voltages.

A method for temporally modulating by using the above TWDM element 100 may includes the following steps:

During a first sub duration of radiation in a first distinguished wavelength, placing the first set of movable reflective rigid plates 110 and the second set of movable reflective rigid plates 120 both at the zero position 180 for providing maximum reflection, and displacing the first set of movable reflective rigid plates 110 to the first position 181 but keeping the second set of movable reflective rigid plates 120 at the zero position 180 for providing maximum diffraction;

During a second sub duration of radiation in a second distinguished wavelength, placing the first set of movable reflective rigid plates 110 and the second set of movable reflective rigid plates 120 both at the zero position 180 for providing maximum reflection, and displacing the second set of movable reflective rigid plates 120 to the second position 182 but keeping the first set of movable reflective rigid plates 110 at the zero position 180 for providing maximum diffraction; and During a third sub duration of radiation in a third distinguished wavelength, placing the first set of movable reflective rigid plates 110 and the second set of movable reflective rigid plates 120 both at the zero position 180 for providing maximum reflection, and displacing the first set of movable reflective rigid plates 110 to the first position 181 and the second set of movable reflective rigid plates 120 to the second position 182 for providing maximum diffraction.

Figure 5:
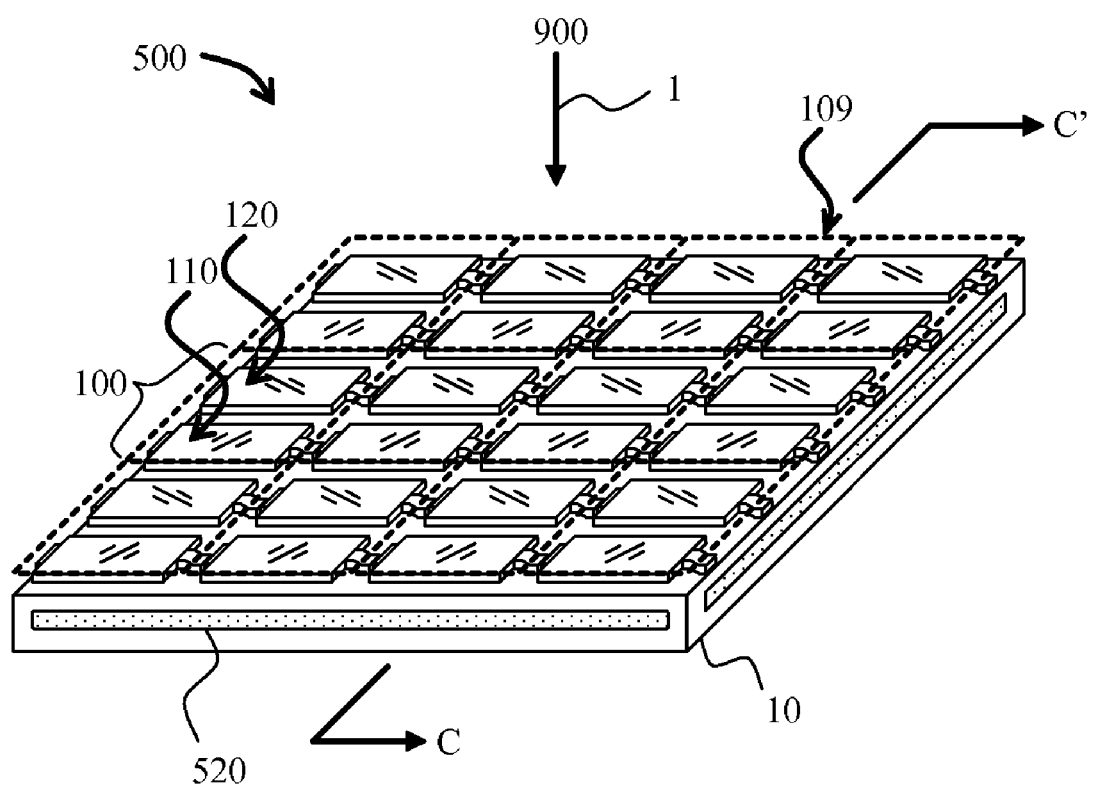
FIG. 5 is a top schematic view of a TWDM imager, comprising a plurality of TWDM elements 100 shown in FIG. 1.

FIG. 5 is a top schematic view of a TWDM imager 500, including a plurality of TWDM elements 100 shown in FIG. 1 in a regularly spaced planar array configuration (for the simplification, only a 2-by-3 array is shown in FIG. 5). Each TWDM element 100 serves as a single pixel of the planar diffractive modulation array, or the TWDM imager 500, in a regularly packed, spatial arrangement parallel to the top reference plane 109. The global driving circuitry 520 gives a series of electrical instructions which generate electrostatic contraction to the first set of movable reflective rigid plates 110 and the second set of movable reflective rigid plates 120 relative to the planar substrate 10 and thus, providing maximum reflection or maximum diffraction to incident electromagnetic radiation 900 at three predefined wavelengths (as described above) in the first direction 1. And each TWDM element 100 may take any planar shapes including but not limited to any of rectangle, square, circle, ellipse, and polygon, for constructing the complete array in a regularly spaced planar arrangement.

An implementation of this TWDM imager 500 for generating video images and projecting them in a projection display system is by introducing electromagnetic radiation 900 of three basic colors, red, green and blue, in a defined time sequence and time divisions, while operating the TWDM imager 500 in full synchronization as widely employed with the digital light processing (DLP) microdisplay systems, as described above for the single TWDM element 100.

Incident visible light can be spatially modulated by the TWDM imager 500, either in a time sequential mode or via spatial combination with help of an aligned color filter array. Differing from a DLP imager, the TWDM imager 500 allows the spatial colorization for microdisplay image formation, widely used in liquid crystal on silicon (LCOS) and transmissive LCD microdisplay systems based on white light illumination as incident electromagnetic radiation 900.

Figure 6:
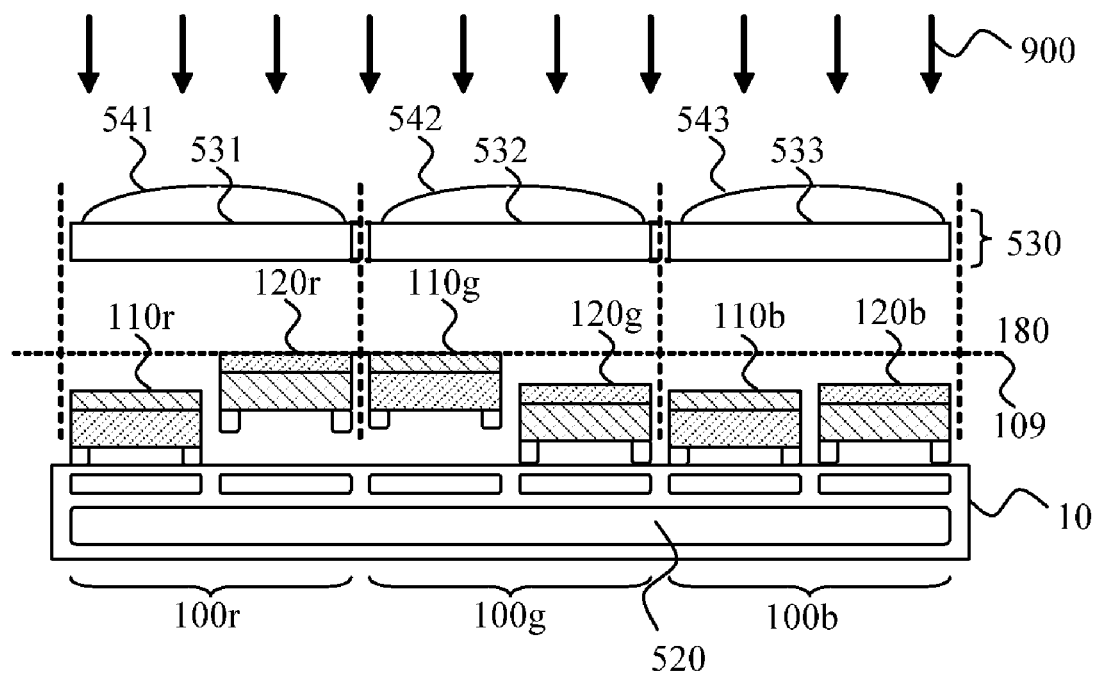
FIG. 6 is a cross section view of the TWDM imager shown in FIG. 5 along C-C'.

FIG. 6 is a cross section view of the TWDM imager 500 shown in FIG. 5, illustrating the spatial colorization for image formation from incident electromagnetic radiation (white light) 900 using a planar band-pass filter array 530. For constructing one pixel of image, the planar band-pass filter array 530 provides one set of three band-pass filter elements (a first band-pass filter element 531, a second band-pass filter element 532 and a third band-pass filter element 533), topping the three corresponding TWDM elements (a red TWDM element 100r, a green TWDM element 100g and a blue TWDM element 100b) in optical alignment along the first direction 1. The first band-pass filter element 531 is adapted to block defined portion of the incident electromagnetic radiation 900 in spectrum outside selected vicinity of a first distinguished wavelength (e.g., red); the second band-pass filter element 532 is adapted to block defined portion of the incident electromagnetic radiation 900 in spectrum outside selected vicinity of a second distinguished wavelength (e.g., green); and the third band-pass filter element 533 is adapted to block defined portion of the incident electromagnetic radiation 900 in spectrum outside selected vicinity of a third distinguished wavelength (e.g., blue).

Though fabricated in the same configuration themselves, the three corresponding TWDM elements (the red TWDM element 100r, the green TWDM element 100g and the blue TWDM element 100b) may be operated separately per the specific wavelengths according to the aligned band-pass filter elements (the first band-pass filter element 531, the second band-pass filter element 532 and the third band-pass filter element 533), providing digitalized modulation in a binary mode, maximum reflection or diffraction as described above. The planar band-pass filter array 530 may be made from any one of polymeric materials comprising Diazidonaphthoquinone (DNQ)-novolac photoresist, pigment, dye, and compounds comprising ZnS and Cryolite.

As shown in FIG. 6, the red first set of movable reflective rigid plates 110r are under contraction to the planar substrate 10 and appropriately displaced while the red second set of movable reflective rigid plates 120r in the red TWDM element 100r set at the zero position 180, for producing the maximum diffraction to the incident red light in the incident electromagnetic radiation 900 after the first (red) band-pass filter element 531. In the same principle, the green second set of movable reflective rigid plates 120g are under contraction to the planar substrate 10 and appropriately displaced while the green first set of movable reflective rigid plates 110g in the green TWDM element 100g set at the zero position 180, for producing the maximum diffraction to the incident green light in the incident electromagnetic radiation 900 after the second (green) band-pass filter element 532. And the blue first set of movable reflective rigid plates 110b and the blue second set of movable reflective rigid plates 120b in the blue TWDM element 100b are both under contraction to the planar substrate 10 and appropriately displaced for producing the maximum diffraction to the incident blue light in the incident electromagnetic radiation 900 after the third (blue) band-pass filter element 533.

All the three TWDM elements (the red TWDM element 100r, the green TWDM element 100g and the blue TWDM element 100b) generate the maximum reflection to the incident illumination after the first band-pass filter element 531, the second band-pass filter element 532 and the third band-pass filter element 533, respectively, when placed at the zero position 180 merged with the top reference plane 109.

Optionally, the first band-pass filter element 531, the second band-pass filter element 532 and the third band-pass filter element 533 may be further topped with a set of micro lenses, 541, 542 and 543, individually optically aligned with the three corresponding TWDM elements (the red TWDM element 100r, the green TWDM element 100g and the blue TWDM element 100b) for improving local collimation of reflected and diffracted light.

A method for temporally modulating by using the above TWDM imager 500 may includes the following steps:

During a first sub duration of radiation in a first distinguished wavelength, placing the first set of movable reflective rigid plates 110 and the second set of movable reflective rigid plates 120 both at the zero position 180 for providing maximum reflection, and displacing the first set of movable reflective rigid plates 110 to the first position 181 but keeping the second set of movable reflective rigid plates 120 at the zero position 180 for providing maximum diffraction, independently on each TWDM element 100 in the TWDM imager;

During a second sub duration of radiation in a second distinguished wavelength, placing the first set of movable reflective rigid plates 110 and the second set of movable reflective rigid plates 120 both at the zero position 180 for providing maximum reflection, and displacing the second set of movable reflective rigid plates 120 to the second position 182 but keeping the first set of movable reflective rigid plates 110 at the zero position 180 for providing maximum diffraction, independently on each TWDM element 100 in the TWDM imager; and During a third sub duration of radiation in a third distinguished wavelength, placing the first set of movable reflective rigid plates 110 and the second set of movable reflective rigid plates 120 both at the zero position 180 for providing maximum reflection, and displacing the first set of movable reflective rigid plates 110 to the first position 181 and the second set of movable reflective rigid plates 120 to the second position 182 for providing maximum diffraction, independently on each TWDM element 100 in the TWDM imager.

A method for spatially modulating by using the above TWDM imager 500 includes synchronized steps as follows:

In alignment with the first band-pass filter 531, placing the first set of movable reflective rigid plates 110 and the second set of movable reflective rigid plates 120 both at the zero position 180 for providing maximum reflection, and then displacing the first set of movable reflective rigid plates 110 to the first position 181 but keeping the second set of movable reflective rigid plates 120 at the zero position 180 for providing maximum diffraction;

In alignment with the second band-pass filter elements 532, placing the first set of movable reflective rigid plates 110 and the second set of movable reflective rigid plates 120 both at the zero position 180 for providing maximum reflection, and then displacing the second set of movable reflective rigid plates 120 to the second position 182 but keeping the first set of movable reflective rigid plates 110 at the zero position 180 for providing maximum diffraction; and In alignment with the third band-pass filter elements 533, placing the first set of movable reflective rigid plates 110 and the second set of movable reflective rigid plates 120 both at the zero position 180 for providing maximum reflection, and then displacing the first set of movable reflective rigid plates 110 to the first position 181 and the second set of movable reflective rigid plates 120 to the second position 182 for providing maximum diffraction.

The present disclosure should not be considered limited to the particular examples described above, but rather should be understood to cover all aspects of the invention as fairly set out in the attached claims. Various modifications, equivalent processes, as well as numerous structures to which the present disclosure may be applicable will be readily apparent to those of skill in the art to which the present disclosure is directed upon review of the instant specification.

What is claimed is:

1. A tri wavelength diffracting modulation (TWDM) element comprises:
   a first set of movable reflective rigid plates, a second set of movable reflective rigid plates, a first set of top reflective surfaces topped with the first set of movable reflective rigid plates, and a second set of top reflective surfaces topped with the second set of movable reflective rigid plates, wherein the first set of top reflective surfaces and the second set of top reflective surfaces are both configured parallel to a top reference plane and have equal reflection to incident electromagnetic radiation of a defined spectrum in a first direction 1;
   wherein the first set of movable reflective rigid plates and the second set of movable reflective rigid plates are adapted to be both placed at a zero position where the first set of top reflective surfaces and the second set of top reflective surfaces are kept at a zero distance relative and parallel to the top reference plane;
   wherein the first set of movable reflective rigid plates is adapted to be displaced to a first position while keeping the first set of top reflective surfaces latched at a first vertical distance from but parallel to the top reference plane; and the second set of movable reflective rigid plates is adapted to be displaced to a second position while keeping the second set of top reflective surfaces latched at a second vertical distance from but parallel to the top reference plane; and
   wherein the first vertical distance is equal to $m*\lambda_1/4$, the second vertical distance is equal to $n*\lambda_2/4$, and absolute difference between the first vertical distance and the second vertical distance is equal to $p*\lambda_3/4$, where the $\lambda_1$, $\lambda_2$ and $\lambda_3$ are first, second and third distinguished wavelengths within the defined spectrum of the incident electromagnetic radiation, and m, n and p are odd integers.

2. The TWDM element according to claim 1, wherein the incident electromagnetic radiation is visible light while $\lambda_1$, $\lambda_2$ and $\lambda_3$ are three chosen color wavelengths between 380 nm and 750 nm.

3. The TWDM element according to claim 1, wherein the first set of movable reflective rigid plates comprises a first set of top electrodes and the second set of movable reflective rigid plates comprises a second set of top electrodes, and the TWDM element further comprises:
   an elemental substrate comprising a first set of bottom electrodes and a second set of bottom electrodes, both electrically connected with a elemental driving circuitry and spatially aligned with the first set of top electrodes and the second set of top electrodes respectively along the first direction; and
   a first set of deformable connectors and a second set of deformable connectors respectively connecting the first set of movable reflective rigid plates and the second set of movable reflective rigid plates structurally to the elemental substrate and electrically to the first set of top electrodes and the second set of top electrodes, and then respectively to the elemental driving circuitry;

wherein the first set of top electrodes and the first set of bottom electrodes are adapted to be electrically charged and discharged for forming electrostatic contraction between the first set of movable reflective rigid plates and the elemental substrate through the elemental driving circuitry; and the second set of top electrodes and the second set of bottom electrodes are adapted to be electrically charged and discharged for forming electrostatic contraction between the second set of movable reflective rigid plates and the elemental substrate through the elemental driving circuitry;

wherein the first set of top electrodes and the first set of bottom electrodes as well as the second set of top electrodes and the second set of bottom electrodes are adapted to be discharged for diminishing electrostatic contraction between the first set of movable reflective rigid plates and the elemental substrate and between the second set of movable reflective rigid plates and the elemental substrate, for keeping the first set of deformable connectors and the second set of deformable connectors all at un-deformed states, so as to place the first set of movable reflective rigid plates and the second set of movable reflective rigid plates both at the zero position; and wherein the first set of top electrodes and the first set of bottom electrodes are adapted to be charged for forming sufficient electrostatic contraction between the first set of movable reflective rigid plates and the elemental substrate, deforming the first set of deformable connectors for moving the first set of top reflective surfaces vertically but in parallel to the top reference plane, and latching the first set of top reflective surfaces at the first position from but parallel to the top reference plane; and the second set of top electrodes and the second set of bottom electrodes are adapted to be charged for forming sufficient electrostatic contraction between the second set of movable reflective rigid plates and the elemental substrate, deforming the second set of deformable connectors for moving the second set of top reflective surfaces vertically but in parallel to the top reference plane, and latching the second set of top reflective surfaces at the second vertical distance from but parallel to the top reference plane.

4. The TWDM element according to claim 3, further comprising a first set of distance limiters installed onto the first set of movable reflective rigid plates and a second set of distance limiters installed onto the second set of movable reflective rigid plates; wherein:

the first set of top electrodes and the first set of bottom electrodes are adapted to be electrically induced with electrical charges of opposite polarizations for generating sufficient electrostatic contraction between the first set of movable reflective rigid plates and the elemental substrate, so as to latch the first set of top reflective surfaces at the first position by the first set of distance limiters; and the second set of top electrodes and the second set of bottom electrodes are adapted to be electrically induced with electrical charges of opposite polarizations for generating sufficient electrostatic contraction between the second set of movable reflective rigid plates and the elemental substrate, so as to latch the second set of top reflective surfaces at the second position by the second set of distance limiters.

5. The TWDM element according to claim 3, wherein the first set of top electrodes is configured at top of the first set of movable reflective rigid plates provided with the first set of top reflective surfaces, and the second set of top electrodes is configured at top of the second set of movable reflective rigid plates provided with the second set of top reflective surfaces.

6. The TWDM element according to claim 3, wherein the first set of top electrodes is configured at bottom of the first set of movable reflective rigid plates provided with the first set of top reflective surfaces, and the second set of top electrodes is configured at bottom of the second set of movable reflective rigid plates provided with the second set of top reflective surfaces.

7. The TWDM element according to claim 6, wherein the first set of movable reflective rigid plates further comprises a first set of reinforcing plates composed with and sandwiched between the first set of top reflective surfaces and the first set of top electrodes, and the second set of movable reflective rigid plates further comprises a second set of reinforcing plates composed with and sandwiched between the second set of top reflective surfaces and the second set of top electrodes.

8. The TWDM element according to claim 7, further comprising:

a first set of displacement translators adapted to connect the first set of movable reflective rigid plates with the first set of top electrodes for translating vertical movement of the first set of top electrodes under electrostatic contraction the elemental substrate to vertical displacement of the first set of movable reflective rigid plates kept in parallel to the top reference plane; and a second set of displacement translators adapted to connect the second set of movable reflective rigid plates with the second set of top electrodes for translating vertical movement of the second set of top electrodes under electrostatic contraction with the elemental substrate to vertical displacement of the second set of movable reflective rigid plates kept in parallel to the top reference plane.

9. The TWDM element according to claim 1, wherein the first set of movable reflective rigid plates and the second set of movable reflective rigid plates are configured in any one of planar shapes comprising square, rectangle, circle, ellipse and polygons.

10. The TWDM element according to claim 1, wherein the first set of top reflective surfaces and the second set of top reflective surfaces are made from any one or combination of reflective metals comprising silver, aluminum, copper, titanium, platinum, gold and their alloys.

11. The TWDM element according to claim 1, wherein the elemental substrate is made from any one of semiconductors comprising silicon, germanium, arsenic and their compounds.

12. The TWDM element according to claim 3, wherein the first set of top electrodes and the second set of top electrodes are made from any one or combination of conductive materials comprising silver, aluminum, copper, titanium, platinum, gold, nickel and cobalt.

13. The TWDM element according to claim 7, wherein the first set of reinforcing plates and the second set of reinforcing plates are made from a combination of metals or dielectric materials comprising oxides, nitrides, carbides and carbon.

14. A tri wavelength diffractive modulation (TWDM) imager, comprising:

a plurality of TWDM elements according to claim 1 in a regularly spaced planar array configuration;

a planar substrate serving as an elemental substrate shared by the plurality of the TWDM elements; and a global driving circuitry built into the planar substrate adapted to coordinate and drive an elemental driving circuitries in association with the TWDM elements.

15. The TWDM imager according to claim 14, further comprising a planar band-pass filter array composed of a first band-pass filter element, a second band-pass filter element and a third band-pass filter element, in a regularly-spaced spatial configuration and each aligned with one of the TWDM elements, adapted to receive the incident electromagnetic radiation before the TWDM elements, wherein
- the first band-pass filter element is adapted to block defined portion of the incident electromagnetic radiation in spectrum outside selected vicinity of a first distinguished wavelength;
- the second band-pass filter element is adapted to block defined portion of the incident electromagnetic radiation in spectrum outside selected vicinity of a second distinguished wavelength; and
- the third band-pass filter element is adapted to block defined portion of the incident electromagnetic radiation in spectrum outside selected vicinity of a third distinguished wavelength.

16. The TWDM imager according to claim 14, wherein the planar band-pass filter array is made from any one of polymeric materials comprising Diazidonaphthoquinone (DNQ)-novolac photoresist, pigment, dye, and compounds comprising ZnS and Cryolite, and each band-pass filter element in the planar band-pass filter array is further associated with a micro lens vertically aligned with a corresponding TWDM element 100 in the first direction.

17. A method for temporally modulating by using the TWDM element according to claim 1, comprising:
- during a first sub duration of radiation in a first distinguished wavelength, placing the first set of movable reflective rigid plates and the second set of movable reflective rigid plates both at the zero position for providing maximum reflection, and displacing the first set of movable reflective rigid plates to the first position but keeping the second set of movable reflective rigid plates at the zero position for providing maximum diffraction;
- during a second sub duration of radiation in a second distinguished wavelength, placing the first set of movable reflective rigid plates and the second set of movable reflective rigid plates both at the zero position for providing maximum reflection, and displacing the second set of movable reflective rigid plates to the second position but keeping the first set of movable reflective rigid plates at the zero position for providing maximum diffraction; and
- during a third sub duration of radiation in a third distinguished wavelength, placing the first set of movable reflective rigid plates and the second set of movable reflective rigid plates both at the zero position for providing maximum reflection, and displacing the first set of movable reflective rigid plates to the first position and the second set of movable reflective rigid plates to the second position for providing maximum diffraction.

18. A method for temporally modulating by using the TWDM imager according to claim 14, comprising:
- during a first sub duration of radiation in a first distinguished wavelength, placing the first set of movable reflective rigid plates and the second set of movable reflective rigid plates both at the zero position for providing maximum reflection, and displacing the first set of movable reflective rigid plates to the first position but keeping the second set of movable reflective rigid plates at the zero position for providing maximum diffraction, independently on each TWDM element in the TWDM imager;
- during a second sub duration of radiation in a second distinguished wavelength, placing the first set of movable reflective rigid plates and the second set of movable reflective rigid plates both at the zero position for providing maximum reflection, and displacing the second set of movable reflective rigid plates to the second position but keeping the first set of movable reflective rigid plates at the zero position for providing maximum diffraction, independently on each TWDM element in the TWDM imager; and
- during a third sub duration of radiation in a third distinguished wavelength, placing the first set of movable reflective rigid plates and the second set of movable reflective rigid plates both at the zero position for providing maximum reflection, and displacing the first set of movable reflective rigid plates to the first position and the second set of movable reflective rigid plates to the second position for providing maximum diffraction, independently on each TWDM element in the TWDM imager.

19. A method for spatially modulating by using the TWDM imager according to claim 14, comprising synchronized steps of:
- in alignment with the first band-pass filter, placing the first set of movable reflective rigid plates and the second set of movable reflective rigid plates both at the zero position for providing maximum reflection, and then displacing the first set of movable reflective rigid plates to the first position but keeping the second set of movable reflective rigid plates at the zero position for providing maximum diffraction;
- in alignment with the second band-pass filter elements, placing the first set of movable reflective rigid plates and the second set of movable reflective rigid plates both at the zero position for providing maximum reflection, and then displacing the second set of movable reflective rigid plates to the second position but keeping the first set of movable reflective rigid plates at the zero position for providing maximum diffraction; and
- in alignment with the third band-pass filter elements, placing the first set of movable reflective rigid plates and the second set of movable reflective rigid plates both at the zero position for providing maximum reflection, and then displacing the first set of movable reflective rigid plates to the first position and the second set of movable reflective rigid plates to the second position or providing maximum diffraction.

* * * * *